United States Patent
Marron et al.

(10) Patent No.: US 9,588,870 B2
(45) Date of Patent: Mar. 7, 2017

(54) TIME TRAVEL DEBUGGING FOR BROWSER COMPONENTS

(71) Applicant: Microsoft Technology Licensing, LLC, Redmond, WA (US)

(72) Inventors: Mark Marron, Redmond, WA (US); James Williamson Mickens, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/751,638

(22) Filed: Jun. 26, 2015

(65) Prior Publication Data
US 2016/0292061 A1  Oct. 6, 2016

Related U.S. Application Data

(60) Provisional application No. 62/143,435, filed on Apr. 6, 2015.

(51) Int. Cl.
*G06F 9/455*  (2006.01)
*G06F 11/36*  (2006.01)

(52) U.S. Cl.
CPC .................. *G06F 11/362* (2013.01)

(58) Field of Classification Search
None
See application file for complete search history.

(56) References Cited

U.S. PATENT DOCUMENTS 6,598,179 B1 *  7/2003  Chirashnya ........... G06F 11/079 714/19
8,321,842 B2 *  11/2012  Xu .................. G06F 9/4418 717/124

(Continued)

OTHER PUBLICATIONS

Grizzard, Julian B. et al. "Analysis of Virtual Machine Record and Replay for Trustworthy Computing". Johns Hopkins APL Technical Digest, vol. 32, No. 2. 2013.*

(Continued)

*Primary Examiner* — Adam Lee
(74) *Attorney, Agent, or Firm* — Alin Corie; Sandy Swain; Micky Minhas

(57) ABSTRACT

Various technologies described herein pertain to performing time travel debugging. A computer-executable program can be executed. The computer-executable program can be executable under control of a virtual machine. The virtual machine can interact with a browser system during execution of the computer-executable program. Moreover, non-deterministic events can be logged via an interrogative virtual machine interface (VMI) during the execution of the computer-executable program. The nondeterministic events can be logged as part of event logs. Moreover, the interrogative VMI is between the virtual machine and the browser system. Further, snapshots of the virtual machine can be captured during the execution of the computer-executable program. The snapshots can be captured via the interrogative VMI. At least a portion of the execution of the computer-executable program can be replayed based at least in part on a snapshot and at least a portion of the event logs.

20 Claims, 8 Drawing Sheets

(56) References Cited

U.S. PATENT DOCUMENTS

| | | | | |
|---|---|---|---|---|
| 8,499,299 B1* | 7/2013 | Jakab | G06F 9/45504 | 710/200 |
| 8,826,273 B1* | 9/2014 | Chen | G06F 9/45558 | 718/1 |
| 8,839,245 B1* | 9/2014 | Khajuria | G06F 17/30233 | 718/1 |
| 9,015,121 B1* | 4/2015 | Salamon | G06F 11/1438 | 707/640 |
| 2009/0007111 A1* | 1/2009 | Nelson | G06F 11/3409 | 718/1 |
| 2009/0119493 A1* | 5/2009 | Venkitachalam | G06F 11/3636 | 712/238 |
| 2009/0119665 A1* | 5/2009 | Venkitachalam | G06F 11/14 | 718/1 |
| 2009/0320011 A1* | 12/2009 | Chow | G06F 11/3612 | 717/154 |
| 2010/0005464 A1* | 1/2010 | Malyugin | G06F 11/3414 | 718/1 |
| 2010/0107158 A1* | 4/2010 | Chen | G06F 11/1438 | 718/1 |
| 2010/0138815 A1* | 6/2010 | Schneider | G06F 8/41 | 717/141 |
| 2010/0149188 A1* | 6/2010 | Roseborough | G06T 13/80 | 345/442 |
| 2011/0023019 A1* | 1/2011 | Aniszczyk | G06F 9/445 | 717/128 |
| 2011/0029821 A1* | 2/2011 | Chow | G06F 11/3476 | 714/45 |
| 2011/0219447 A1* | 9/2011 | Horovitz | G06F 9/45533 | 726/22 |
| 2011/0264787 A1* | 10/2011 | Mickens | G06F 11/3414 | 709/224 |
| 2011/0296245 A1* | 12/2011 | Alberi | G06F 11/3664 | 714/38.1 |
| 2012/0239987 A1* | 9/2012 | Chow | G06F 9/45533 | 714/49 |
| 2012/0246640 A1* | 9/2012 | Marshall | G06F 9/45558 | 718/1 |
| 2013/0263114 A1* | 10/2013 | Watkins | G06F 9/45558 | 718/1 |
| 2013/0283242 A1* | 10/2013 | Gounares | G06F 11/3672 | 717/128 |
| 2014/0282555 A1* | 9/2014 | Daudel | G06F 9/455 | 718/100 |
| 2014/0331277 A1* | 11/2014 | Frascadore | H04L 63/20 | 726/1 |
| 2014/0366026 A1* | 12/2014 | Ohtake | G06F 11/1464 | 718/1 |
| 2016/0127307 A1* | 5/2016 | Jain | G06F 3/0619 | 709/245 |
| 2016/0154710 A1* | 6/2016 | Wade | G06F 11/1469 | 714/19 |

OTHER PUBLICATIONS

Barr, et al., "TARDIS: Affordable Time-Travel Debugging in Managed Runtimes", In Microsoft Research Technical Report: MSR-TR-2014-47, Apr. 12, 2014, pp. 1-14.

Burg, et al., "Interactive Record/Replay for Web Application Debugging", In UIST, Oct. 8, 2013, 11 pages.

King, et al., "Debugging Operating Systems with Time-Travel Virtual Machines", In USENIX Annual Technology Conference, 2005, pp. 1-15.

Mickens, et al., "Mugshot: Deterministic Capture and Replay for Javascript Applications", In NSDI, 2010, pp. 1-15.

"RR: Lightweight Recording and Deterministic Debugging", Mozilla rr tool, Retrieved Date: Jun. 25, 2015, Retrieved at: <<http://rr-project.org/>>, 4 pages.

* cited by examiner

TIME TRAVEL DEBUGGING FOR BROWSER COMPONENTS

CROSS-REFERENCE TO RELATED APPLICATION

This application claims priority to U.S. Provisional Patent Application No. 62/143,435, filed on Apr. 6, 2015, and entitled "TIME TRAVEL DEBUGGING FOR BROWSER COMPONENTS", the entirety of which is incorporated herein by reference.

BACKGROUND

Developers commonly spend significant amounts of time debugging programs. Developers often apply the scientific method when debugging programs; for instance, a developer may observe behavior of a program on different inputs, first to reproduce a bug, then to localize the bug in source code of the program. Reproducing, localizing, and then fixing bugs typically involve forming and validating hypotheses about root causes of the bugs. A root cause of a bug is a first point at which a state of a program diverges from an intended state. To validate a hypothesis, a developer often halts program execution and examines the state of the program. Especially early in debugging, when the developer's query is still elusive, execution is commonly halted too soon or too late to validate a hypothesis. Overshooting (e.g., late halting of the execution of the program) can be expensive because returning to an earlier point in an execution of a program commonly involves restarting and re-running the program.

A virtual machine can be useful for capturing a state of a program. For example, a virtualization layer can act as a boundary for encapsulating program state, which can enable snapshotting, migrating, and resuming complex, multi-level software applications. A virtual machine interface (VMI) of a virtual machine can provide an introspection point for logging events that affect program execution.

Some conventional virtual machines, which virtualize at the x86-level, provide strong and efficient isolation. By virtualizing at the x86-level, these conventional virtual machines can provide precise snapshots that capture hardware-level information. However, with these conventional approaches, a full virtual machine snapshot can be on the order of hundreds of MBs in size, and an x86-level event log can grow on the order of hundreds of MBs per day.

A debugger can be used to halt program execution and examine the state of the program (e.g., via a graphical user interface (GUI)). However, tool support for debugging has remained relatively unchanged for many years. Accordingly, the cost of restarting and re-running the program when a breakpoint is placed too late in the execution of the program remains.

SUMMARY

Described herein are various technologies that pertain to performing time travel debugging. A computer-executable program can be executed. The computer-executable program can be executable under control of a virtual machine. The virtual machine can interact with a browser system during execution of the computer-executable program. Moreover, nondeterministic events can be logged via an interrogative virtual machine interface (VMI) during the execution of the computer-executable program. The nondeterministic events can be logged as part of event logs. Moreover, the interrogative VMI is between the virtual machine and the browser system. Further, snapshots of the virtual machine can be captured during the execution of the computer-executable program. The snapshots can be captured via the interrogative VMI. At least a portion of the execution of the computer-executable program can be replayed based at least in part on a snapshot and at least a portion of the event logs.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
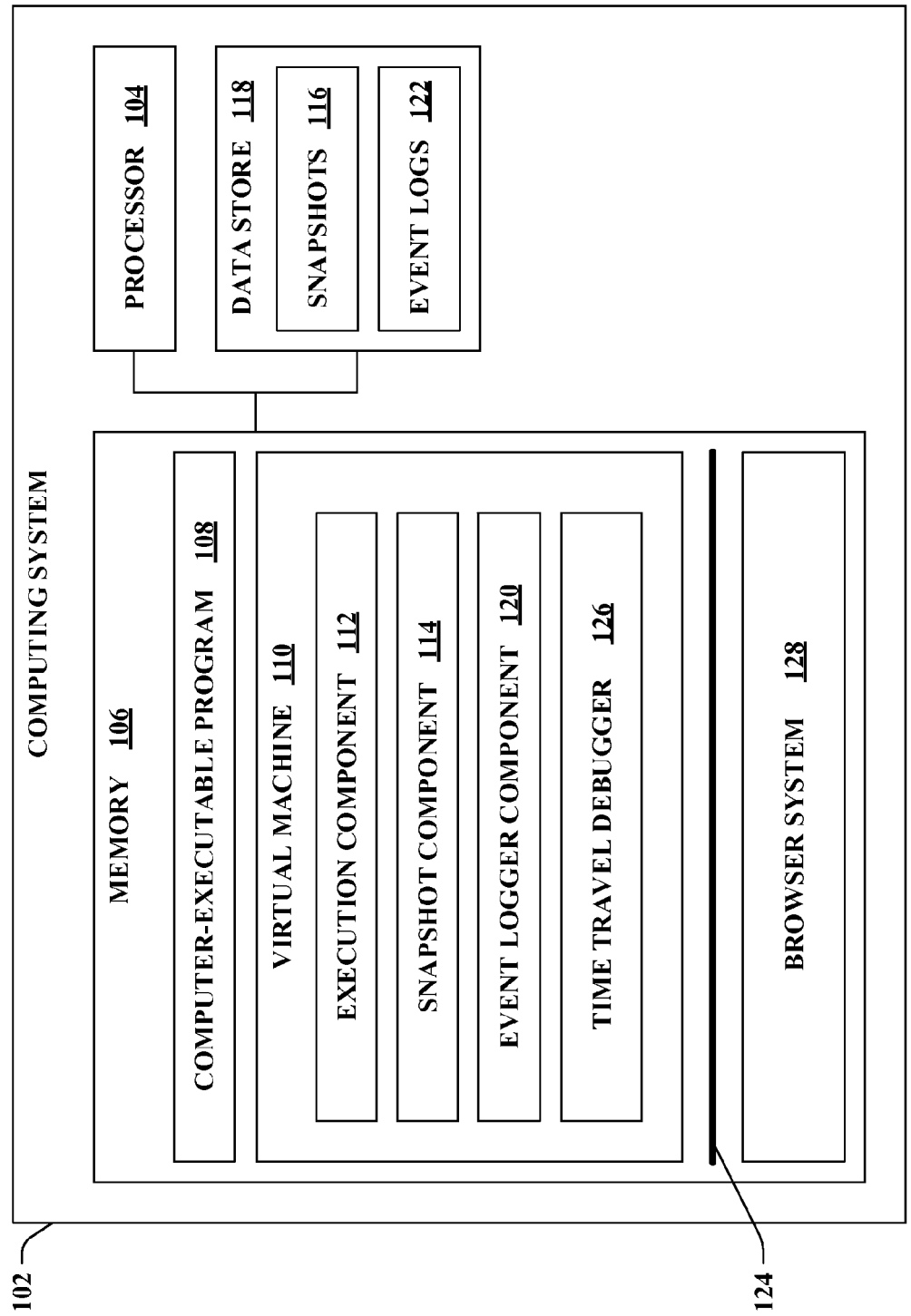
FIG. 1 illustrates a functional block diagram of an exemplary computing system that performs time travel debugging.

Various technologies pertaining to performing time travel debugging with browser components are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a computing system 102 that performs time travel debugging. The computing system 102 includes at least one processor 104 and memory 106. The at least one processor 104 is configured to execute instructions loaded into the memory 106 (e.g., system(s) and/or component(s) loaded into the memory 106 are executable by the processor 104). As described in greater detail herein, the memory 106 includes instructions configured to perform time travel debugging for a browser system 128.

According to various examples, the computing system 102 can be or include a computing device. Pursuant to various illustrations, the computing device can be a desktop computing device, a mobile computing device (e.g., a laptop computing device, a mobile telephone, a tablet computing device, a wearable computing device, a handheld computing device, a portable gaming device, a personal digital assistant (PDA), etc.), a gaming console, a set-top box, an in-vehicle communications and infotainment system, or the like. In accordance with other examples, the computing system 102 can be or include one or more server computing devices. For instance, the computing system 102 can be or include one or more datacenters, where a datacenter includes a plurality of server computing devices. Additionally or alternatively, the computing system 102 can be a distributed computing system.

The memory 106 of the computing system 102 includes a computer-executable program 108 and a virtual machine (VM) 110 (e.g., a managed runtime, etc.). The computer-executable program 108 can include a sequence of instructions that are executable under control of the virtual machine 110. The virtual machine 110 can compile and/or interpret the computer-executable program 108 for the processor 104 and perform the instructions included in the computer-executable program 108.

The memory 106 further includes the browser system 128 (e.g., a web browser). The browser system 128 can be configured to retrieve, present, and traverse information available on a network, in a file system (e.g., of the computing system 102 or a disparate computing system), or the like. Moreover, an interrogative virtual machine interface (VMI) 124 is an interface between the virtual machine 110 and the browser system 128. The interrogative VMI 124 enables nondeterministic events to be exposed to the virtual machine 110. The interrogative VMI 124 exposes minimal amounts of state belonging to otherwise opaque black box components. A minimal amount of state from a particular black box component can be a least amount of state for accurately snapshotting and logging events for such black box component.

The virtual machine 110 can be a process virtual machine that runs as an application inside a host operating system and supports a process. The virtual machine 110 can provide a platform-independent programming environment that abstracts details of the underlying hardware or operating system, and enables the computer-executable program 108 to be executed on differing platforms.

According to an example, the computer-executable program 108 can be or include a script written in a scripting language (e.g., JavaScript, etc.); following this example, the script can be interpreted and executed by the virtual machine 110. However, it is contemplated that other types of computer-executable programs and other types of virtual machines (other types of managed runtimes) are intended to fall within the scope of the hereto appended claims (e.g., a computer-executable program written in the Java programming language and Java web toolkit (JWt), a computer-executable program written in the C# programming language and Windows Presentation Foundation (WPF), etc.).

The virtual machine 110 includes an execution component 112 that can be configured to receive the computer-executable program 108. Moreover, the execution component 112 can be configured to execute the computer-executable program 108.

According to an example, the execution component 112 can be or include an interpreter. According to an exemplary scenario, the interpreter can directly perform the instructions of the computer-executable program 108. In accordance with another exemplary scenario, the interpreter can translate the instructions of the computer-executable program 108 to an intermediate representation and can execute the intermediate representation. According to yet another exemplary scenario, the instructions of the computer-executable program 108 can include precompiled code, and the interpreter can execute such precompiled code (e.g., the precompiled code can be machine independent code). Moreover, it is contemplated that a combination of the foregoing exemplary scenarios can be implemented by the interpreter. Further, pursuant to an illustration, it is contemplated that the interpreter can be a bytecode interpreter; yet, other types of interpreters are intended to fall within the scope of the hereto appended claims.

By way of another example, the execution component 112 can additionally or alternatively be or include a just-in-time (JIT) compiler. The JIT compiler can convert intermediate language instructions of the computer-executable program 108 to machine instructions for execution by the processor 104. Further, the JIT compiler can execute the machine instructions.

The virtual machine 110 can further include a snapshot component 114 configured to record a sequence of snapshots 116 of the virtual machine 110 (e.g., VM snapshots) during execution of the computer-executable program 108 at various times. The snapshot component 114 can be configured to record the snapshots 116 via the interrogative VMI 124 Moreover, the snapshots 116 recorded by the snapshot component 114 can be stored in a data store 118 of the computing system 102. The computer-executable program 108, during execution by the execution component 112, stores data in variables, which represent storage locations in the memory 106 (e.g., call stack, heap, etc.). At a given point during the execution of the computer-executable program 108, content of the storage locations in the memory 106 can be recorded as a snapshot of the virtual machine 110.

According to an example, the snapshots 116 in the sequence can be periodically recorded by the snapshot component 114 at a predefined time interval. Pursuant to another example, a time interval at which the snapshots 116 are sequentially recorded by the snapshot component 114 can be dynamically adjusted; following this example, the time interval can be dynamically adjusted during the execution of the computer-executable program 108.

Moreover, the virtual machine 110 can include an event logger component 120 configured to log nondeterministic events during execution of the computer-executable program 108 as part of event logs 122. The event logs 122, for example, can be stored in the data store 118. The event logger component 120 can log the nondeterministic events that affect execution of the computer-executable program 108 via the interrogative VMI 124. For instance, the virtual machine 110 can be extended to define the interrogative VMI 124, which enables the event logger component 120 to capture various nontraditional events. Moreover, the event logs 122 can enable a variety of debugging analyses.

Due to the interrogative VMI 124, the snapshot component 114 and the event logger component 120 can efficiently capture application-level semantics in order to reduce the size of the snapshots 116 and the event logs 122. By raising the abstraction level of the interrogative VMI 124 to that of the application of interest, the snapshot component 114 and/or the event logger component 120 can ignore portions of architectural state in an operating system (OS) and the hardware when capturing the snapshots 116 and/or the event logs 122.

According to an example, the virtual machine 110 can be a runtime environment layered atop a lower-level runtime environment. Such virtualized interfaces can enable various useful services. For example, the virtual machine 110 can hide sensitive low-level resources from untrusted applications (e.g., such resources can be hidden from the computer-executable program 108), and cause potentially dangerous operations to pass dynamic security checks. Moreover, if the event logger component 120 of the virtual machine 110 logs the nondeterministic data that the virtual machine 110 exchanges with the computer-executable program 108, then the event logs 122 can later be used by a time travel debugger 126 to replay the execution of the computer-executable program 108; these replayed executions, for instance, can be useful for security forensics and debugging of the computer-executable program 108. The virtual machine 110 can also define an encapsulation boundary for a state of the computer-executable program 108 (e.g., the snapshots 116 can be useful for suspend/resume services, and for migrating applications across different machines).

Various properties of the interrogative VMI 124 are now described. The interrogative VMI 124 can reduce a size of a virtual machine state (in comparison to conventional low-level virtual machines). Smaller virtual machines are faster to snapshot, faster to load, and faster to transfer across a network as compared to larger virtual machines. In turn, this makes it cheaper to perform suspension, resumption, and migration of a virtual machine. Small virtual machines also allow datacenter operators to place more virtual machines on a single physical server, which allows for enhanced server utilization.

Moreover, the interrogative VMI 124 can cause a size of the nondeterministic event logs 122 to be reduced (relative to conventional low-level virtual machines). For many debugging and forensics scenarios, static snapshots 116 of the virtual machine 110 may provide insufficient context; thus, the snapshots 116 can be supplemented with the event logs 122 that describe how the virtual machine 110 evolves between the snapshots 116. Small event logs 122, combined with small snapshots 116, make it feasible to store long-term execution traces for complex applications (e.g., the computer-executable program 108).

Further, the interrogative VMI 124 can enable the snapshots 116 and the event logs 122 to be semantically complete. The snapshots 116 and the event logs 122 can include information for understanding the execution history of the computer-executable program 108 by the virtual machine 110. Thus, execution analyses can be performed without using heuristics for inferring application state (e.g., such heuristics may be fallible).

Moreover, the interrogative VMI 124 enables efficient generation of the snapshots 116 by the snapshot component 114 and the event logs 122 by the event logger component 120. Accordingly, snapshotting and event logging can be fast and can have low computational overheads due to the interrogative VMI 124 (e.g., as compared to snapshotting and event logging for conventional low-level virtual machines).

Interrogative virtualization is supported by the interrogative VMI 124. A level of abstraction of the interrogative VMI 124 for the virtual machine 110 is raised as compared to some conventional VMIs for some traditional virtual machines; more particularly, the interrogative VMI 124 is moved away from interfaces presented by the hardware or the operating system, and towards an application-level semantic interface. For example, managed language runtimes and application frameworks can mediate a program's interactions with the local machine and the outside world. Virtualizing at the application-visible level of abstraction allows large amounts of architectural state that is oftentimes captured by low-level approaches to be ignored. However, not all of the low-level state can be ignored as is common with conventional managed language runtimes and application frameworks. For example, a raw bitmap for a display may be hidden by the application-visible graphics interface, but this state may be needed for understanding the execution history of the computer-executable program 108. Thus, interrogative virtualization makes modifications to the high-level application interface, instead providing the interrogative VMI 124 that exposes events to the virtual machine 110 which are hidden from the computer-executable program 108. The virtual machine 110 can interrogate nominally black box components via the interrogative VMI 124 to enable the snapshot component 114 and the event logger component 120 to capture the application-level semantics while safely ignoring many details at the hardware or operating system level.

Many traditional VMIs tend to be designed to provide efficient and strong isolation between different virtual machines. As a result, these traditional VMIs provide narrow, low-level interfaces to minimize the trusted computing base and leverage hardware support for virtualization. However, virtualizing at a low-level involves a trade-off: isolation becomes cheap, but other virtual machine operations become expensive. For instance, conventional virtual machine snapshots oftentimes are large because they include substantial amounts of architectural state. Further, execution traces commonly grow quickly due to the vast number of low-level nondeterministic events. Moreover, application-level program analysis is often overdetermined, since a conventional virtual machine commonly includes data from multiple layers in the software and hardware stack, when often the top layers (without the lower layers) enable understanding execution of a computer-executable program.

In contrast to traditional VMIs, the interrogative VMI 124 for the virtual machine 110 can be high-level and wide enough to capture application semantics. Compared to low-level, narrow virtualization interfaces, the interrogative VMI 124 can enable implementing various virtual machine operations using an order of magnitude less time and space. To provide strong, efficient isolation, the interrogative VMI 124 can be nested within a low-level virtualization framework, which can provide security; thus, security need not be sacrificed for performance.

The virtual machine 110 can also include the time travel debugger 126 (the time travel debugger 126 can also be referred to as a time travel debugger component). The time travel debugger 126 can be configured to test and debug the computer-executable program 108. The time travel debugger 126 is a debugger that steps forwards and backwards through execution of a computer-executable program (e.g., the computer-executable program 108) during a debugging session. In contrast, conventional debuggers oftentimes tend to step forwards through execution of a computer-executable program during a debugging session, without being able to step backwards through such execution. For instance, the time travel debugger 126 allows execution to be reversed during a debugging session (e.g., if a breakpoint is set too late so as to not require re-execution of a computer-executable program with the breakpoint moved to be earlier in time). The time travel debugger 126 supports forward and reverse debugging of the computer-executable program 108. As noted above, when the computer-executable program 108 is executed by the execution component 112, the snapshot component 114 can record the snapshots 116 and the event logger component 120 can record nondeterministic events in the event logs 122 to capture the execution of the computer-executable program 108. The time travel debugger 126 can be configured to replay the execution of the computer-executable program 108 by stepping the execution of the computer-executable program 108 both forwards and backwards in time.

The time travel debugger 126 can be configured to replay at least a portion of the execution of the computer-executable program 108 based at least in part on a snapshot (from the snapshots 116) and at least a portion of the event logs 122. Using the interrogative VMI 124, the time travel debugger 126 can enable time travel debugging for the browser system 128. Conventionally, time travel debugging often is too expensive to run on production servers or on resource-limited end-user machines with poor network connections.

The time travel debugger 126 can be configured to perform backwards-facing variants for traditional forward-facing operations like step-forward and step-out. By instrumenting the interrogative VMI 124, the event logger component 120 can log nondeterministic events (e.g., the event logs 122) and the snapshot component 114 can capture the snapshots 116 of the virtual machine 110. Later, during a debugging session, the time travel debugger 126 can be configured to travel to time t by identifying a snapshot from the snapshots 116 that temporally precedes time t, loading the snapshot that temporally preceded time t, and then replaying the event logs 122 from the snapshot to the time t. For example, a most recent snapshot from the snapshots 116 that occurred before t can be loaded by the time travel debugger 126; however, it is contemplated that a differing snapshot from the snapshots 116 that occurred before t can alternatively be loaded by the time travel debugger 126.

By logging events and tracking state at the level of the interrogative VMI 124, storage overheads can be reduced in comparison to systems that introspect at a lower level (e.g., x86 instructions, or systems calls and UNIX signals). With the interrogative VMI 124, sizes of the snapshots 116 of the state of the virtual machine 110 and the nondeterministic event logs 122 can be decreased as compared to lower-level approaches. For instance, heap-intensive applications can have compressed snapshots that are less than 500 KB in size. Moreover, for interactive games and applications, the event logs may grow at about 1 KB per second. The time travel debugger 126 can also provide more robust, higher-fidelity replay than conventional systems that lack the vantage point of the interrogative VMI 124, and which consequently rely on inference methods to reconstruct state that is readily available in the interrogative system as described herein.

The virtual machine 110 and the interrogative VMI 124 enable nondeterminism logging of event logs 122 and capturing of snapshots 116. Further, the snapshots 116 and the event logs 122 can be device and address independent.

According to an example, it is contemplated that the time travel debugger 126, on a program bug, can report an error state as well as a last k-seconds of events before the bug. Pursuant to an illustration, the snapshots 116 and the event logs 122 can be at the JavaScript/HTML level, which can be saved for later debugging or transmitted to another computing system. Moreover, the other computing system need not have the same version of JavaScript/HTML engines or operating system. However, the claimed subject matter is not limited to the foregoing illustration.

Figure 2:
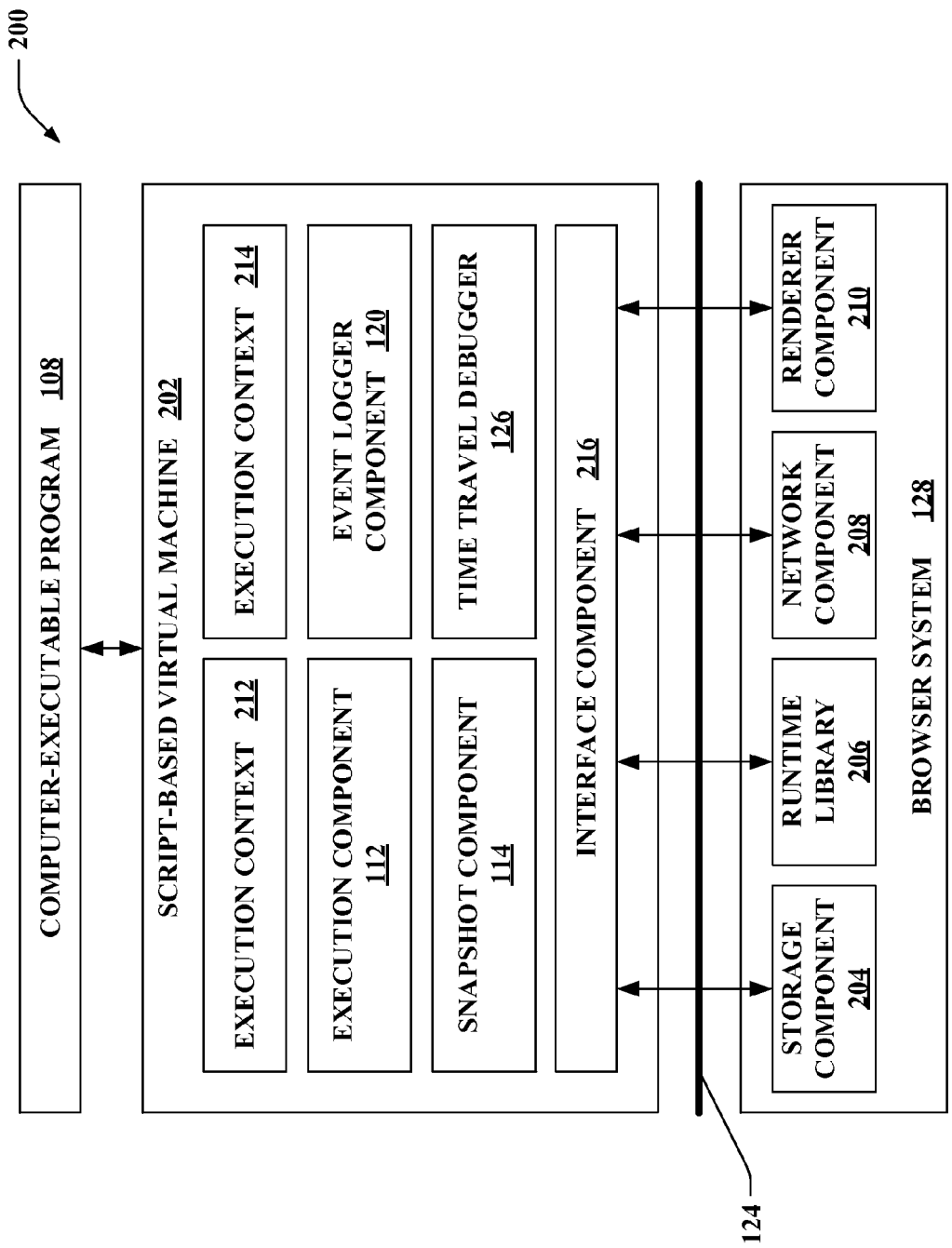
FIG. 2 illustrates a functional block diagram of an exemplary system that employs interrogative virtualization to enable time travel debugging.

Turning to FIG. 2, illustrated is a system 200 that employs interrogative virtualization to enable time travel debugging. The system 200 includes a script-based virtual machine 202; thus, as set forth in the example of FIG. 2, the virtual machine 110 can be the script-based virtual machine 202. The script-based virtual machine 202 can interpret and execute the computer-executable program 108. More particularly, the computer-executable program 108 can be a script written in a scripting language (e.g., JavaScript, etc.), and thus, the script-based virtual machine 202 can interpret and execute such script. Moreover, the script-based virtual machine 202 can include the execution component 112, the snapshot component 114, the event logger component 120, and the time travel debugger 126.

The system 200 further includes the browser system 128. The browser system 128 can include various components. As depicted, the browser system 128 can include a storage component 204, a runtime library 206, a network component 208, and a renderer component 210. However, it is contemplated that the browser system 128 may lack one or more of the foregoing components and/or may include differing components. Moreover, the interrogative VMI 124 is an interface between the script-based virtual machine 202 and the browser system 128.

The script-based virtual machine 202 can include one or more execution contexts. As illustrated, the script-based virtual machine 202 is shown as including an execution context 212 and an execution context 214. However, it is contemplated that the script-based virtual machine 202 can include more or less than two execution contexts. The execution contexts of the script-based virtual machine 202 are collectively referred to herein as execution contexts 212-214. Each of the execution contexts 212-214 can be single-threaded and event-driven.

According to an illustration, as the execution context 212 (or any of the other execution contexts 212-214) runs its initialization code, callback functions that respond to events are defined. After the initialization code terminates, subsequent code execution can be driven by reception of events and firing of associated handlers. Since the execution context 212 is single-threaded, a call chain that is initiated by an event handler is atomic; once started, the call chain runs to completion, and at any given time, the execution context 212 has at most one active call chain. Moreover, different execution contexts 212-214 can exchange data using an asynchronous, pass-by-value communication channel (e.g., postMessage( )).

The components of the browser system 128 (e.g., the storage component 204, the runtime library 206, the network component 208, the renderer component 210, etc.) can be event-driven black box components. These components can be black boxes because, from the perspective of the computer-executable program 108, such components hide their implementations behind opaque interfaces. However, the execution contexts 212-214 are event-driven, so the black box components can export event-driven interface(s) to interoperate with the computer-executable program 108.

The script-based virtual machine 202 can include an interface component 216 configured to interact with the black box components of the browser system 128 via exposed interfaces (e.g., application programming interfaces (APIs)) of the black box components. Accordingly, the black box components of the browser system 128 can be interrogated by the interface component 216 of the script-based virtual machine 202 via the interrogative VMI 124.

Pursuant to an example, the renderer component 210 can be a black box component of the browser system 128. Internally, the renderer component 210 can be written in C++, and it may use multiple threads or processes to calculate visual layouts and update a bitmap. However, from the perspective of an execution context (e.g., one of the execution contexts 212-214, a frame in a web page), the renderer component 210 exposes a single-threaded, event-driven API through the Document Object Model (DOM). To receive notifications about changes to DOM state by the renderer component 210, the computer-executable program 108 can register callbacks which the renderer component 210 triggers when the relevant state changes. The computer-executable program 108 can modify DOM state through a variety of synchronous and asynchronous APIs. However, even the synchronous APIs can be implemented as remote procedure call (RPC) messages that trigger event handlers in the renderer component 210; to provide synchronous semantics, the browser system 128 can pause the caller until the renderer component 210 has responded to the RPC request.

The script-based virtual machine 202 can include one or more message-driven execution contexts 212-214, some of which may be black boxes with respect to the computer-executable program 108. Other examples of black box components include the network component 208 (e.g., a network stack in the browser system 128) and the storage component 204 (e.g., database interfaces used by server-side scripting language frameworks).

Given the event-driven nature of the script-based virtual machine 202, the interrogative VMI 124 can include an aggregate set of event channels. By interposing on messages exchanged via these channels, the interactions between the various components in the script-based virtual machine 202 may be captured. However, black box components oftentimes do not generate events for various changes to internal state. For example, the computer-executable program 108 can request the renderer component 210 to perform a Cascading Style Sheets (CSS) animation that periodically modifies a user-visible DOM state. At any given moment, the computer-executable program 108 can synchronously request the renderer component 210 for a view of the DOM. However, these synchronous queries hide the fact that the renderer component 210 executes in parallel with the computer-executable program 108. The renderer component 210 typically updates the visual display without triggering script-side notifications, meaning that the script-side view of the DOM can desynchronize from the true DOM state inside the renderer component 210. This may be sufficient if it is desired to isolate and analyze the execution contexts 212-214. However, if it is desired to isolate and analyze the complete script-based virtual machine 202 (for a client-side web page or a Node application), missing events can impact correctness, performance, or both. Moreover, the script-based virtual machine 202 may include multiple execution contexts 212-214 and black box components. It is to be appreciated that a debugger for a web page can produce erroneous results if it lacks sufficient insights into rendering events. Further, logging and replay can be more efficient when the VMI event interface is semantically complete, such as the interrogative VMI 124.

To ensure this semantic completeness, the black box components can be modified so that these components export a wider variety of events. This approach is referred to herein as interrogative virtualization, and includes interrogating the black box components to reveal specific parts of their hidden states. Interrogative virtualization extends the virtualization interface itself to improve the performance or correctness of operations upon virtual machines.

For example, if the script-based virtual machine 202 runs inside of a web browser (e.g., the browser system 128), the renderer component 210 can be changed to report a tick count associated with an animation. The renderer component 210 can be configured to perform the animation and associate the tick count with the animation, where the tick count can be indicative of how close the animation is to a final repaint. Following this example, the tick count associated with the animation can be exposed to the script-based virtual machine 202 via the interrogative VMI 124.

According to another example, if the script-based virtual machine 202 runs within a server-side Node deployment, the storage component 204 (e.g., the database stack) can be modified to enable logging objects that are read and written to storage. Pursuant to a further example, the network component 208 can download an external resource (e.g., the renderer component 210 can cause the network component 208 to download the external resource, etc.); following this example, an event indicative of the external resource being downloaded by the network component 208 can be exposed to the script-based virtual machine 202 via the interrogative VMI 124. By way of yet another example, a callback list managed by the renderer component 210 can be exposed to the script-based virtual machine 202 via the interrogative VMI 124.

Figure 3:
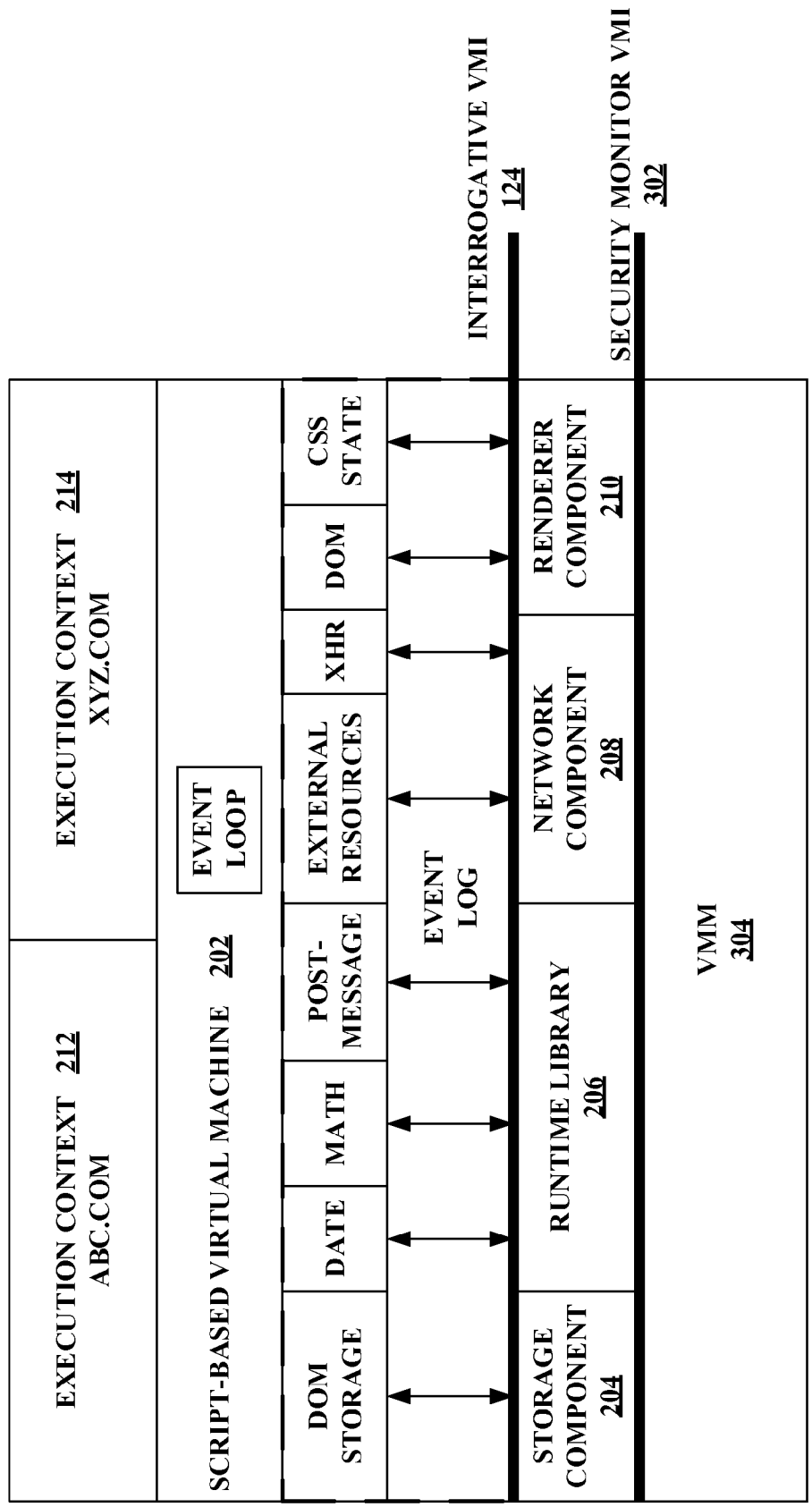
FIG. 3 illustrates a functional block diagram of another example of a script-based virtual machine.

FIG. 3 illustrates another example of the script-based virtual machine 202 (e.g., the script-based virtual machine 202 can be a JavaScript virtual machine, etc.). The script-based virtual machine 202 of FIG. 3 again includes the execution contexts 212-214 (e.g., an execution context for abc.com and an execution context for xyz.com). Moreover, although not shown, it is contemplated that the script-based virtual machine 202 can further include the execution component 112, the snapshot component 114, the event logger component 120, and/or the time travel debugger 126.

The script-based virtual machine 202 supports nested virtualization. In general, large interfaces may negatively impact security. Such interfaces can increase a threat surface that is visible to an attacker, and their rich semantics can cause defenders to reason about a variety of corner cases. Interrogative virtualization adds communication channels to the virtual interface, so at first glance, interrogative virtualization seems to negatively impact security—there appear to be more opportunities for an attacker to escape an isolation container of the script-based virtual machine 202. However, the application-visible execution interface need not be conflated with a structural isolation boundary. The former is the interface that applications directly invoke, whereas the latter is the interface at which isolation and security are enforced.

As shown in FIG. 3, nested virtualization can be used to layer the interrogative VMI 124 (e.g., with a rich, wide interface) atop a smaller, low-level VMI (e.g., a security monitor VMI 302) defined by a virtual machine monitor (VMM) 304 (e.g., a hypervisor). The VMM 304 can provide services that allow multiple operating systems to execute on hardware of a computing system (e.g., the computing system 102). Isolation enforcement is performed by the VMM 304, but other management decisions involving the script-based virtual machine 202 are performed by an interrogative VM VMM 304. The interrogative VMM 304 can be similar to a library OS for the VM; yet, since the interrogative interface is sufficiently expressive to capture the application-level semantics, the library OS's internal state need not be included in the snapshots (e.g., the snapshots 116) or the event logs (e.g., the event logs 122). For example, the interrogative VMI 124 does not expose raw memory addresses, so even though the VMM 304 may internally manipulate raw addresses, those addresses are not mentioned in the event logs or the snapshots. By excluding unnecessary architectural state from the interrogative VMI 124, sizes of snapshots and event logs can be reduced by an order of magnitude.

The interrogative VMI 124 can be constructed by extending the script-based virtual machine 202 used by a web browser (e.g., the browser system 128). Interfaces (e.g., the interface component 216) of the script-based virtual machine 202 to black box components, such as the storage component 204, the runtime library 206, the network component 208 (e.g., the network stack), and the renderer component 210, can be modified to include a number of interrogative APIs to expose hidden state. Using the interrogative VMI 124, an efficient snapshotting mechanism (e.g., executed by the snapshot component 114) can be implemented for the script-based virtual machine 202; this can facilitate VM suspension, migration, and resumption. Further, the interrogative VMI 124 can be augmented to record (e.g., via the event logger component 120) the nondeterministic events that enter and leave the script-based virtual machine 202. The result can be, for instance, a fully functional interrogative VMI 124 for the client-side of a web application.

Hidden state can be exposed via the interrogative VMI 124. The script-based virtual machine 202 can allow scripting language code to perform computations. To allow scripting language code to access local storage, exchange network traffic, and interact with the display, the script-based virtual machine 202 can communicate with external input-output (I/O) modules. Runtime information about the IO stack as well as the script-based virtual machine 202 can be captured via the interrogative VMI 124. Below are some examples that enable application-level semantics to be captured.

CSS/SVG Animation State: Browsers commonly use a dedicated thread to perform CSS and Scalable Vector Graphics (SVG) animations. These animations typically run in parallel with script execution, and once triggered, they conventionally run to completion (e.g., not paused or resumed by scripting language code).

Internally, the renderer component 210 can associate a tick count with each animation. The tick count represents how close the animation is to its final repaint. The renderer component 210 can expose these tick counts to the script-based virtual machine 202 via the interrogative VMI 124. The tick counts can be employed as logical clock values to synchronize the concurrent execution of the script-based virtual machine 202 and the renderer component 210. Moreover, the renderer component 210 can allow the script-based virtual machine 202 to pause or restart an animation from a given tick count via the interrogative VMI 124.

Event Listeners: As described herein, the scripting language code can be event-driven. For instance, after a page's initialization code runs, subsequent code can be triggered by the arrival of events like key presses and mouse clicks. The scripting language code can register callback functions for events (e.g., using the addEventListener(evtName, callback) method). An application can register multiple callbacks for the same event.

Callback lists are managed by the renderer component 210; such callback lists typically cannot be accessed from a conventional virtual machine. In contrast, the script-based virtual machine 202 can access the callback lists managed by the renderer component 210 via the interrogative VMI 124. At snapshot time, the script-based virtual machine 202 can use the interrogative VMI 124 to enumerate and the callback lists and serialize such lists. At resurrection time, the script-based virtual machine 202 can use an interface of the renderer component 210 that restores the serialized lists.

External Resources: Objects in the DOM can refer to resources that are hosted on external servers. For example, img elements refer to images, and iframe elements refer to HTML documents. To fetch such external content, the renderer component 210 can bypass the script-based virtual machine 202 and directly communicate with the network component 208 (e.g., the network stack).

Accordingly, the network component 208 can expose a set of additional events to the script-based virtual machine 202 via the interrogative VMI 124. Examples of such events exposed by the network component 208 include an event that indicates when the network component 208 has finished downloading a resource. This allows the interrogative VMI 124 to be employed by the script-based virtual machine 202 to log the fetched value, as well as determine when the download completed with respect to other concurrent activities like execution of a computer-executable program (e.g., the computer-executable program 108).

Timers: Applications can spawn and cancel one-time or recurring timers. According to an example, a setTimeout interface can be used by the script-based virtual machine 202 to spawn a one-time timer, a setInterval interface can be used by the script-based virtual machine 202 to spawn a recurring timer, a clearTimeout interface can be used by the script-based virtual machine 202 to cancel a one-time timer, and a clearInterval interface can be used by the script-based virtual machine 202 to cancel a recurring timer. The renderer component 210, for instance, can manage these timers; yet, the renderer component 210 typically does not expose their state to conventional virtual machines.

These four interfaces can be interposed on from within the script-based virtual machine 202 to keep track of and expose active timers and their associated callbacks. According to another example, the renderer component 210 can be modified to expose the timers to the script-based virtual machine 202 via the interrogative VMI 124. By way of another example, the script-based virtual machine 202 can add new active timers when the application creates them and timestamp their creation, and remove them when the application clears them. Following this example, when a one-time timer fires (e.g., upon expiration of the timer), the script-based virtual machine 202 removes it from the active set. Moreover, pursuant to this example, when an interval timer fires, the script-based virtual machine 202 updates its timestamp.

State snapshots (e.g., captured by the snapshot component 114 of the script-based virtual machine 202) are now described in greater detail. To capture a snapshot of the script-based virtual machine 202, the snapshot component 114 can wait for each execution context 212-214 to quiesce. Each execution context 212-214 can be single-threaded, so quiescence can occur when the local event loop has finished executing an event handler; stack state need not be captured since the context has no outstanding call chains. Once the execution contexts 212-214 are paused, the snapshot component 114 can capture black box state using the interrogative APIs of the interrogative VMI 124.

DOM Elements: A DOM element may have a set of string properties, a nested tree of DOM elements, and event listeners. The snapshot component 114 can capture this information using existing DOM interfaces and the VMI extensions. To resurrect the DOM state in a snapshot, each DOM object can be recreated using existing DOM interfaces (e.g., to create an element, to set an attribute, etc.).

In general, the renderer component 210 can execute in parallel with the script-based virtual machine 202. However, the renderer component 210 can block during synchronous RPC exchanges with the script-based virtual machine 202. Accordingly, to avoid race conditions at snapshot time, the interface of the renderer component 210 can be extended to support a synchronous, no-op RPC that prevents the renderer component 210 from generating GUI events, repainting the screen, and so on. Using this no-op RPC, the snapshot component 114 can pause the renderer component 210 before serializing the state of the script-based virtual machine 202. This ordering can mitigate the execution contexts 212-214 from including references to stale renderer-side state.

Canvas Context: Canvas elements in the DOM can have an associated context object that includes the visual state of the canvas. The context object can be retrievable using an interface that gets a context object of a canvas. The snapshot component 114 can record each canvas's visual state as a bitmap. During snapshot inflation, the bitmap can be reapplied to restore the canvas to its previous state.

Heap: Managed languages often have garbage collectors that can efficiently walk the heap. The snapshot component 114 can identify live scripting language objects and serialize such objects. Primitive values like numbers and strings can be serialized. Moreover, arrays and objects can be serialized as bags of properties. Object references (including references to DOM objects) can be rewritten to point to the target object's location in the snapshot.

Event Queue: When the snapshot component 114 runs, execution contexts are quiescent. However, the contexts may have non-empty event queues. Each event can include one or more callbacks to invoke, and one or more arguments to pass to the callbacks. The snapshot component 114 can serialize this information and place it in the snapshot.

CSS/SVG Animation State: The snapshot component 114 can record the tick count of active CSS and SVG animations. When the snapshot is later inflated, the interrogative interface can be used to resume each animation at the suspension-time tick count.

Timers: The snapshot component 114 can calculate and record the remaining time left on each active timer, the interval duration for recurring timers, and each timer's associated callback. One-time timers can be restored during snapshot inflation using an interface that sets a timeout. For recurring timers, the interface that sets the timeout can be used for initiation to resume the interrupted recurrence. Further, an interface that sets an interval can be used to resume the normal interval.

Nondeterministic event logging (e.g., performed by the event logger component 120 of the script-based virtual machine 202) is now described in greater detail. While snapshots depict the script-based virtual machine 202 at particular moments in time, the nondeterministic event logs describe how the script-based virtual machine 202 evolves between snapshots. Using the interrogative VMI 124, event logs grow slowly because, compared to raw x86 code, the scripting language code can be more deterministic. The event logger component 120 can use the interrogative VMI 124, during the execution of the computer-executable program, to log an event that is scheduled, a DOM tree difference between events for a DOM change, a tick count associated with an animation, a value change for a window state, a value from a synchronous source, and a timer identifier.

The following table provides an overview of the events that can be tracked via the interrogative VMI 124. In the text below, these events are described in more detail.

| Category | Representative APIs | Log Strategy |
| --- | --- | --- |
| Event Scheduling | DOM Events, timers, XMLHttpRequest | Event logging |
| DOM Changes | Form fields, checkboxes | DOM tree diffs between events |
| CSS/SVG Animations | animation-* CSS properties | Log animation tick before every event, pause during events |
| Window State | Window size, scrollbar position | Log value changes before every event |
| External Resources | iframe src, img src | Log data in I/O subsystem |
| Synchronous Sources | Date, Math.random | Value logging |
| Timer IDs | setTimeout, setInterval | Value logging |
| XMLHttpRequest Status | XMLHttpRequest | Object diffs between events |

The event logger component 120 can serialize black box object references. Some nondeterministic events can refer to objects that reside in a black box component. For example, the network component 208 (e.g., the network stack) can expose a Hypertext Transfer Protocol (HTTP) connection to the script-based virtual machine 202 using an XMLHttpRequest (XHR) object. When an execution context does var xhr=new XMLHttpRequest( ) the network component 208 can create a new internal object, and then pass that C++ object from the network component 208 to the script-based virtual machine 202. Such hosted objects have a scripting language wrapper, but can reside within the black box component.

Hosted objects can subsequently be referenced by events. For example, when HTTP data arrives, the network component 208 can pass an event object to the execution context; the target property of the event can be the XMLHttpRequest object that was created via a new operator, where the new operator creates an instance of an object type. At logging time, the identity of the XMLHttpRequest object can be recorded in the event. According to an example, edge relationships between objects in a heap graph can be preserved.

Object Tagging: In general, a hosted object can be created via the new operator before it can appear in an event. For example, an XMLHttpRequest object can be created and initialized before it can generate network events. At logging time, the interrogative VMI 124 interposes on the new operator and assigns a unique integer identifier to each hosted object. By interposing on the event interface, script-based virtual machine 202 can log the identifier of the hosted object in each event.

Later, at replay time, the interrogative VMI 124 can be used by the script-based virtual machine 202 to assign identifiers as above; hosted objects can receive the same logging-time identifiers, since replay is deterministic. At replay time, the interrogative VMI 124 also can be used by the script-based virtual machine 202 to maintain a map that associates an identifier with its hosted object. When replaying an event, the script-based virtual machine 202 can use the interrogative VMI 124 to extract the hosted object identifier from the event log, fetch the associated hosted object from the map, and attach that hosted object to the event that is passed to the execution context.

DOM Paths: Object tagging typically does not work for DOM elements, since a DOM element can be referenced by an event without a prior scripting language call to the new operator. For example, HTML of a page can register a scripting language click handler for a button element. When the button is clicked, the browser can generate an event which references the button. Following this illustration, the execution context has not previously seen that DOM element, and thus, has not been tagged.

To solve the foregoing, the interrogative VMI 124 can be used to log a DOM element using the element's path in the HTML tree. For example, the DOM path {2,5} represents the DOM node that is found by examining the second child of the <html> tag, and the fifth child of that tag.

Moreover, during execution, various nondeterministic browser interfaces schedule events. As a result, the order of events is nondeterministic, and is to be controlled during program replay.

Logging Events: An event loop of the script-based virtual machine 202 can log each event. A type of an event can be a string such as "mouseclick", and can be logged. Moreover, a target node of an event can be logged using object identifiers or DOM paths. A callback function of an event can be logged as the integer index of the callback in a callback list of the target node.

Unlike most events, timers do not have an event object; timers have a callback function. When a timer fires (e.g., at expiration of the timer), the timer's unique identifier can be logged. The interrogative VMI 124 can use this identifier to lookup the callback function associated with the timer during replay.

Below is exemplary pseudocode of an unmodified, traditional event loop.

| Traditional event loop |
| --- |
| 1. while (webpageIsOpen) { |
| 2.     var ev = getNextEvent( ); |
| 3.     dispatchEvent(ev.callback, ev.args); |
| 4. } |

In comparison, exemplary psuedocode of the event loop of the script-based virtual machine 202 to log event schedules is now set forth.

| Event loop to log event schedules |
| --- |
| 1. while (webpageIsOpen) { |
| 2.     var ev = getNextEvent( ); |
| 3.     log(browser.getGUIChanges( )); |
| 4.     log(ev); |
| 5.     dispatchEvent(ev.callback, ev.args); |
| 6. } |

As set forth in the above pseudocode, GUI changes can be logged at line 3 and events can be logged at line 4.

Replaying Events: During replay of the script-based virtual machine 202, the event loop can ignore real events that are generated by the browser. Instead, the script-based virtual machine 202 can control script execution directly, using the event log. Below is exemplary pseudocode for the event loop of the script-based virtual machine 202 to re-execute a script during replay.

| Event loop for program re-execution |
| --- |
| 1. while (webpageIsOpen) { |
| 2.     applyGUIChanges(log.read( )); |
| 3.     var ev = log.read( ); |
| 4.     dispatchEvent(ev.callback, ev.args); |
| 5. } |

Moreover, scripting language code can force updates to a state of the renderer component 210 (e.g., by dynamically adding an image to the DOM tree). However, an update to the renderer component 210 may not be initiated by an execution context. For example, if the user types a string into a textbox, or selects an item in a drop-down list, a state of the renderer component 210 may be updated. The interrogative VMI 124 can be used to capture these state changes in the event log.

DOM Elements: The renderer component 210 can be frozen while an execution context is executing an event handler; during this time, scripting language code can modify a state of the renderer component 210. As a result, GUI changes that are not initiated by an execution context can occur between events. Accordingly, the script-based virtual machine 202 can log DOM changes that occur between events. Since the DOM is a tree that mirrors an HTML structure of a page, the interrogative VMI 124 can log the DOM changes as a tree diff. At replay time, the script-based virtual machine 202 can replay the changes on live GUI objects.

A benefit of using a tree diff is that the event log need not record an intermediate state between events, as that state is irrelevant to deterministic program replay. This design leads to shorter logs than a naïve approach that logs every individual change to the web page's state. For example, consider a scenario where a user types "Jeff" into a text field and hits a "Submit" button that triggers an event. No scripting language code runs while the user is typing into the text field. The text field has four intermediate states corresponding to each additional character added to the text field, but only the full entry is utilized. In this scenario, the log includes one entry for that text field with the string "Jeff".

CSS/SVG Animations: Modern browsers typically execute CSS/SVG animations in parallel with script execution. The interrogative VMI 124 extensions can be used to pause animations while scripting language code executes, and to log the tick counts of active animations as they play. While this changes the semantics of animations in a target browser, it is noted that some browsers do not play animations in parallel with script execution. During replay, the interrogative VMI 124 extensions can be used to explicitly reset animations to appropriate tick counts before dispatching an event from the log.

Window State: A global window object can include a number of properties related to the status of the GUI, such as scrollbar position, currently active DOM element, and size of the browser viewport. Like with animations, the interrogative VMI 124 logs these values prior to event execution, and resets these values prior to dispatching a replayed event.

External Resources: DOM elements can refer to external network resources. For example, img elements refer to images, and iframe elements refer to HTML files. Using the interrogative extensions to the network component 208, the interrogative VMI 124 can record external network fetches at logging time, and return the logged data at replay time.

It is further contemplated that the GUI may not be the only source of nondeterminism for an execution context. Below are various examples of non-GUI sources of nondeterminism.

Synchronous sources: The interrogative VMI 124 can log return values from the nondeterministic functions Date( ) and Math.random( ). The interrogative VMI 124 can also log read values from the localStorage interface and from Cookies. During replay, the interrogative VMI 124 interposes on these interfaces to return logged values.

Timer IDs: Each timer created with the setInterval interface and the setTimeout interface can have a unique identifier associated with it, which the renderer component 210 can determine. The interrogative VMI 124 can log identifier values returned from these interfaces. During replay, the interrogative VMI 124 can interpose on these interfaces to return the same identifiers, and interact with the VMI's timer extensions to update its active timer state.

XMLHttpRequest: Like DOM elements, XMLHttpRequest objects commonly are frozen while an event executes. The interrogative VMI 124 can maintain a list of the live XMLHttpRequest objects, and check them for property changes before a new event is dispatched. If an object's properties have changed, the event log records the changes as a diff from the object's previous state. During replay, the interrogative VMI 124 can use the hosted object map to find the relevant XMLHttpRequest and apply the deltas from the log before handing the associated event to an execution context.

Pursuant to an example, the script-based virtual machine 202 can be configured to perform a reverse execution of the computer-executable program to a causal event based on the snapshot(s) and/or the event logs. According to an illustration, the script-based virtual machine 202 can be a JavaScript virtual machine that can include the time travel debugger 126. The interrogative VMI 124 and the time travel debugger 126 can enable a reverse-step to a causal event. For instance, JavaScript programs frequently utilize callbacks via timers, XHR, promises (e.g., from the ECMAScript Harmony (6th Edition) (ES6) standard), etc. to implement event handling. Similar features exist in other programming languages such as the async construct for C#. When debugging these callbacks, a common challenge may be to understand why a particular function was set as a callback and what the call-stack was at that time. In a traditional debugger this information is typically lost by the time the callback code is executed. In contrast, the techniques set forth here can retain the logical time at which each callback is set, and what the callback is. By storing such logical time at which each callback is set and what the callback is, the time travel debugger 126 can enable direct reverse executing to a causal source. Accordingly, the foregoing functionality can enable a developer to understand where the callback was registered and the state of the program at such point in time.

By way of illustration, snapshots and/or event logs can include identities of callbacks and corresponding logical times at which the callbacks are set during the execution of the computer-executable program. Thus, the identities of the callbacks and the corresponding logical times at which the callbacks are set during the execution can be stored. The identities of the callbacks and the corresponding logical times can be exposed to the script-based virtual machine 202 via the interrogative VMI 124 during the execution of the computer-executable program. Further, the time travel debugger 126 can replay at least a portion of the execution of the computer-executable program based at least in part on the identities of the callbacks and the corresponding logical times. For instance, the time travel debugger 126 can perform a reverse execution of the computer-executable program to a causal event based at least in part on the identities of the callbacks and the corresponding logical times.

Figure 4:
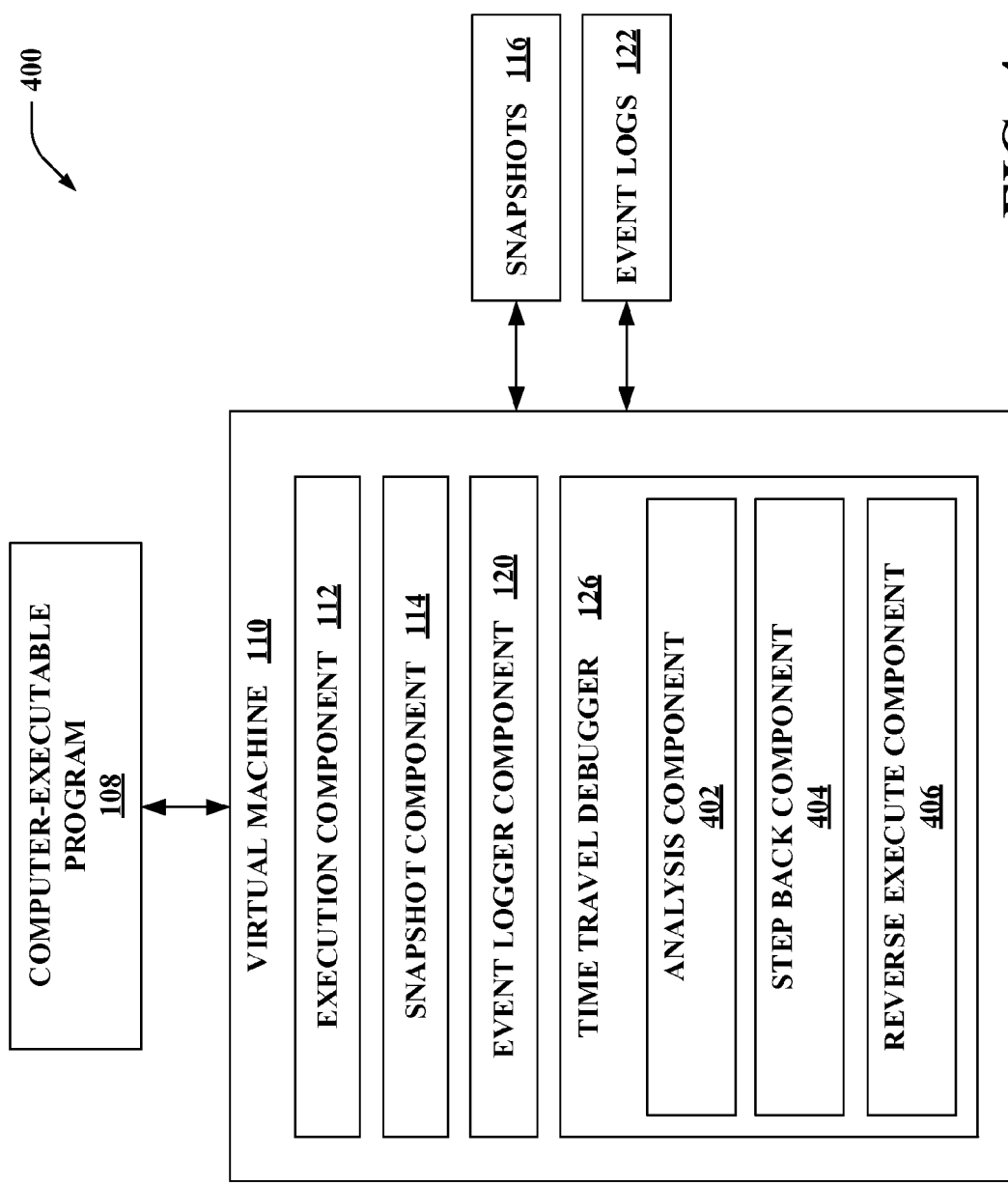
FIG. 4 illustrates a functional block diagram of an exemplary system that performs time travel debugging.

Now turning to FIG. 4, illustrated is a system 400 that performs time travel debugging. The system 400 includes the virtual machine 110, the computer-executable program 108, the snapshots 116, and the event logs 122. The virtual machine 110 can include the execution component 112, the snapshot component 114, the event logger component 120, and the time travel debugger 126. The time travel debugger 126 can be a time travel debugger for a web browser (e.g., the browser system 128).

The time travel debugger 126 can receive an input (e.g., from a developer) that sets a breakpoint in the computer-executable program 108. The time travel debugger 126 can enable traveling backwards in time from that point to previously executed statements. Conventional time travel debuggers often trade replay fidelity for performance, or vice versa. In contrast, the time travel debugger 126 can provide both replay fidelity and performance. By leveraging the interrogative VMI 124, the time travel debugger 126 can handle interactions with black boxes while still providing efficient logging and replay.

The time travel debugger 126 can use the snapshots 116 captured by the snapshot component 114 and the event logs 122 captured by the event logger component 120. The time travel debugger 126 can reinflate a snapshot S to return to a time that is represented by S. To return to a time t that is between two snapshots, the time travel debugger 126 can load the last snapshot temporally preceding t, and then replay the event logs 122 until t is reached.

During execution of the computer-executable program 108 by the execution component 112 (e.g., before a time travel debugging session has started), the time travel debugger 126 can enable the event logger component 120 to capture the nondeterministic event logs 122 and can enable the snapshot component 114 to create snapshots 116 (e.g., at regular intervals, etc.). The snapshots 116 can be created at quiescent points between events; since handlers may run for a few milliseconds, the snapshots 116 can be captured at regular intervals. The snapshot interval can set an upper bound on a cost to seek to an arbitrary point in the execution of the computer-executable program 108.

The time travel debugger 126 can include an analysis component 402 configured to evaluate latency of time travel operations. Based on the latency, the analysis component 402 can cause the snapshot component 114 to record one or more additional snapshots of the virtual machine 110 during replay of the execution of the computer-executable program 108. If the snapshot interval is too large, jumping through time can be slow, since the time travel debugger 126 may have to replay many events to reach the desired execution point. However, if the time travel debugger 126 records too many snapshots during normal program execution, the computer-executable program 108 may suffer poor performance. Thus, at replay time, the analysis component 402 can be configured to opportunistically cause the snapshot component 114 to generate snapshots to reduce the latency of future time travel operations. By way of illustration, if the time travel debugger 126 is time travelling towards t, and starts from a "far-away" snapshot (where distance is defined in terms of events), the analysis component 402 can cause the snapshot component 114 to generate a new snapshot at an event that more closely precedes t. This optimization can be based on the common debugging scenario in which a developer explores a set of program states that are temporally nearby.

When a snapshot exists that is close to t, returning to t can typically be instantaneous (or nearly instantaneous) from the perspective of a human developer. Further, the runtime cost of inflating a snapshot can be a few hundreds of milliseconds, and replaying an individual event may take a few milliseconds.

According to an exemplary scenario, the time travel debugger 126 can repeatedly inflate and replay from the same snapshot as the developer interacts with debugger features like step back, which returns to a previously executed statement (e.g., in a script, etc.). If the computer-executable program 108 includes a large amount of state, full snapshot inflation may introduce developer-visible delays. By way of example, in such a scenario, the time travel debugger 126 can avoid restoring the entire heap, and instead roll back the memory pages that changed during replay from the last snapshot. However, the claimed subject matter is not limited to the foregoing example.

The time travel debugger 126 can provide a variety of reverse-facing complements to conventional debugger features. Below, implementation of these features atop the interrogative VMI 124 is described. The time travel debugger 126 can employ various interrogative methods to introspect execution of the computer-executable program 108 at the level of individual statements. As set forth below, the time travel debugger 126 can time travel to a particular basic block, a particular statement within that block (or to the last statement of the basic block that jumped to the current block), and so forth.

Logical timestamps for basic blocks can be used. Although the time travel debugger 126 can return to previous execution states using the interrogative VMI 124, the time travel debugger 126 also can pause execution at an appropriate point during a replayed event handler. Existing debuggers commonly allow developers to place conditional breakpoints at specific program statements; in contrast, the time travel debugger 126 can allow for breakpoints to be placed at a desired logical time during execution.

To support logical time breakpoints, the interrogative VMI 124 introduces an additional interrogative interface: the interrogative VMI 124 can expose the number of times that a basic block has executed. The time travel debugger 126 can use these logical timestamps in conditional breakpoints to determine when to pause execution during time travel backwards to a particular basic block.

The time travel debugger 126 can represent logical time as a two-tuple, where the first element is a function call count from the start of program execution, and the second element is the basic block count within the current function call. With this design, the time travel debugger 126 tracks function call counts through the lifetime of the computer-executable program 108; however, basic block counts can be discarded once a function call terminates. Function call counts can be included in state snapshots, and can be reset when the time travel debugger 126 loads a snapshot.

The time travel debugger 126 can further include a step back component 404 configured to identify a previously executed statement prior in the computer-executable program 108. For instance, the previously executed statement can be prior to a breakpoint. The step back component 404 can be configured to identify the previously executed statement based on one or more of the snapshots 116 and at least a portion of the event logs 122. Based on such identification, the step back component 404 can provide various step back functionality. Within a particular basic block with no function calls, the previously executed statement is the previous statement in the basic block. However, when the previous statement is a function call, the previously executed statement is the last statement to execute in the called function.

To support the step back component 404 with low overhead, the interrogative VMI 124 can expose a location and logical time of the previous jump or return statement. If a current statement is at the start of a basic block or follows a function call, then the previous statement is the previous jump or return statement. Otherwise, the previous statement is the previous statement in the current basic block.

Examples of debugger features that can be provided by the step back component 404 include step back, step back over, and step back out of.

Step back complements step forward, and lets a developer return to a previously-executed program statement. To implement step back, the step back component 404 places a time-aware breakpoint on the previously executed program statement. Then, the step back component 404 replays execution from the previous snapshot that is closest to the logical time of the breakpoint.

Step back over complements step over, and lets a developers return to a previously executed program statement in a current function. To implement step back over, the step back component 404 places a time-aware breakpoint on the previous program statement in the current basic block at the current logical time, and replays execution from the nearest snapshot. If the current statement is the first statement in its basic block, then a jump immediately preceded it; in this case, step back over has the same behavior as step back.

Step back out of complements step out of, and travels back to a statement that called the current function. When implementing step back out of, the step back component 404 places a time-aware breakpoint on the call site of the current function using the logical time associated with the caller's stack frame. Then, the step back component 404 replays execution from the previous snapshot closest to the logical time of the breakpoint.

Moreover, the time travel debugger 126 can include a reverse execute component 406 configured to perform a reverse execution of the computer-executable program 108 from a current breakpoint in the computer-executable program 108 to a previous breakpoint in the computer-executable program 108. The reverse execute component 406 can be configured to perform the reverse execution based on one or more of the snapshots 116 and at least a portion of the event logs 122. Reverse execute complements continue execution, and travels back to the previous breakpoint. With reverse execution, the time travel debugger 126 may not know if/when each of the currently placed breakpoints will execute. Thus, the time travel debugger 126 does not know which will execute closest in logical time to the current program statement.

To implement reverse execute, the reverse execute component 406 can be configured to perform a temporal search to identify the previous breakpoint. The reverse execute component 406 further places a time-aware breakpoint at the current program statement, loads the nearest previous snapshot, and executes until the current program statement. During execution, the reverse execute component 406 can record the logical time and location of triggered breakpoints. A last breakpoint to trigger before the current program statement can be determined to be the time-travel destination by the reverse execute component 406.

If the reverse execute component 406 does not encounter a breakpoint, it performs the same procedure, but reinflates the program state from two snapshots away instead of one. This process repeats until the reverse execute component 406 finds a breakpoint that triggers, or reaches the beginning of execution. In the latter case, the program uses the first statement in program execution as the time-travel destination. Once the reverse execute component 406 identifies a time-travel destination, it places an appropriate time-aware breakpoint, and replays execution from the closest snapshot to that destination.

Figure 5:
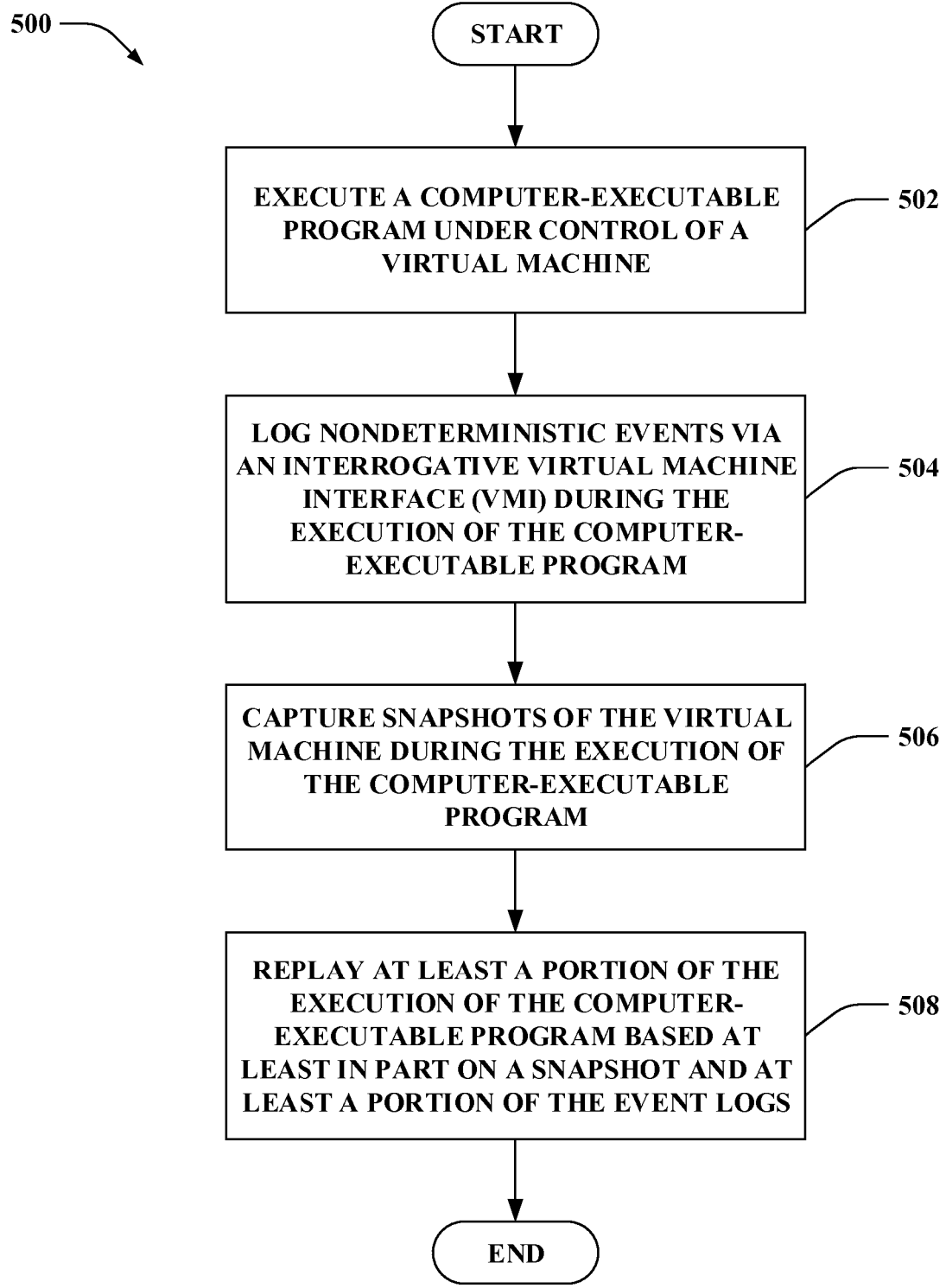
FIG. 5 is a flow diagram that illustrates an exemplary methodology for performing time travel debugging.
Figure 6:
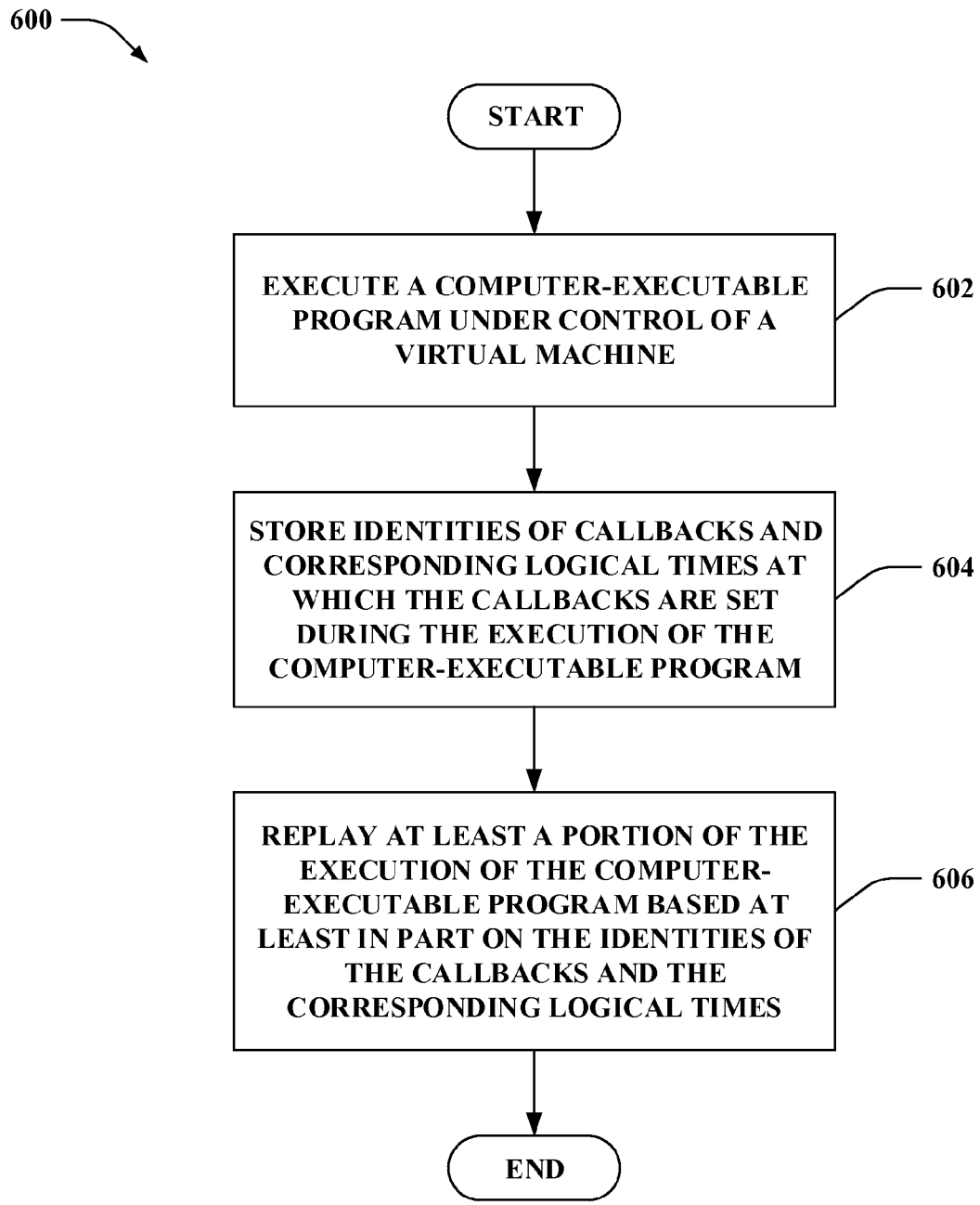
FIG. 6 is a flow diagram that illustrates an exemplary methodology for performing time travel debugging.

FIGS. 5-6 illustrate exemplary methodologies relating to time travel debugging for a web browser. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 for performing time travel debugging. At 502, a computer-executable program can be executed. The computer-executable program can be executable under control of a virtual machine. Moreover, the virtual machine interacts with a browser system during execution of the computer-executable program. At 504, nondeterministic events can be logged via an interrogative virtual machine interface (VMI) during the execution of the computer-executable program. The nondeterministic events can be logged as part of event logs. Moreover, the interrogative VMI is between the virtual machine and the browser system. At 506, snapshots of the virtual machine can be captured during the execution of the computer-executable program. The snapshots can be captured via the interrogative VMI. At 508, at least a portion of the execution of the computer-executable program can be replayed based at least in part on a snapshot and at least a portion of the event logs.

FIG. 6 illustrates another methodology 600 for performing time travel debugging. At 602, a computer-executable program can be executed. The computer-executable program can be executable under control of a virtual machine. Moreover, the virtual machine interacts with a browser system during execution of the computer-executable program. At 604, identities of callbacks and corresponding logical times at which the callbacks are set during the execution of the computer-executable program can be stored. The identities of the callbacks and the corresponding logical times can be exposed to the virtual machine via an interrogative virtual machine interface (VMI) during the execution of the computer-executable program. Moreover, the interrogative VMI is between the virtual machine and the browser system. At 606, at least a portion of the execution of the computer-executable program can be replayed based at least in part on the identities of the callbacks and the corresponding logical times.

Figure 7:
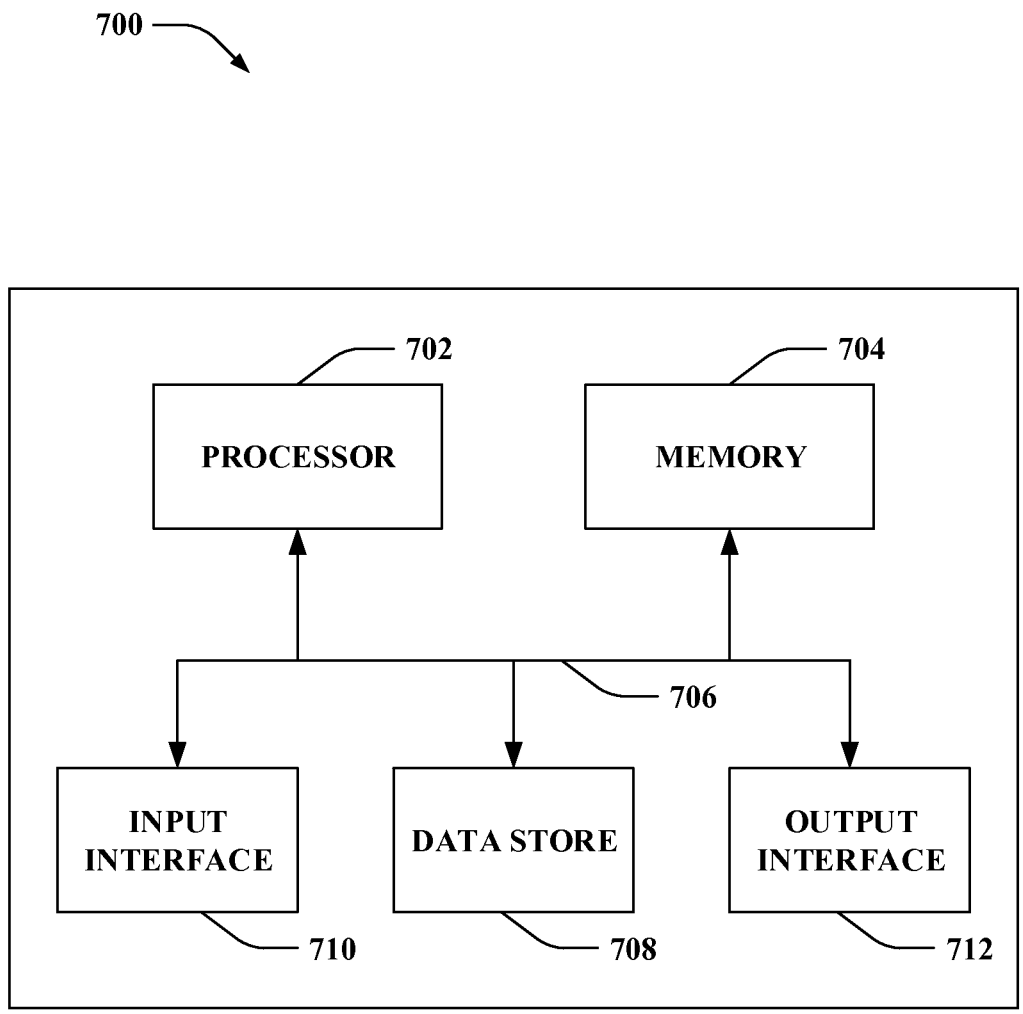
FIG. 7 illustrates an exemplary computing device.

Referring now to FIG. 7, a high-level illustration of an exemplary computing device 700 that can be used in accordance with the systems and methodologies disclosed herein is illustrated. For instance, the computing device 700 may be used in a system that performs time travel debugging. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store snapshots, event logs, and so forth.

The computing device 700 additionally includes a data store 708 that is accessible by the processor 702 by way of the system bus 706. The data store 708 may include executable instructions, snapshots, event logs, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Figure 8:
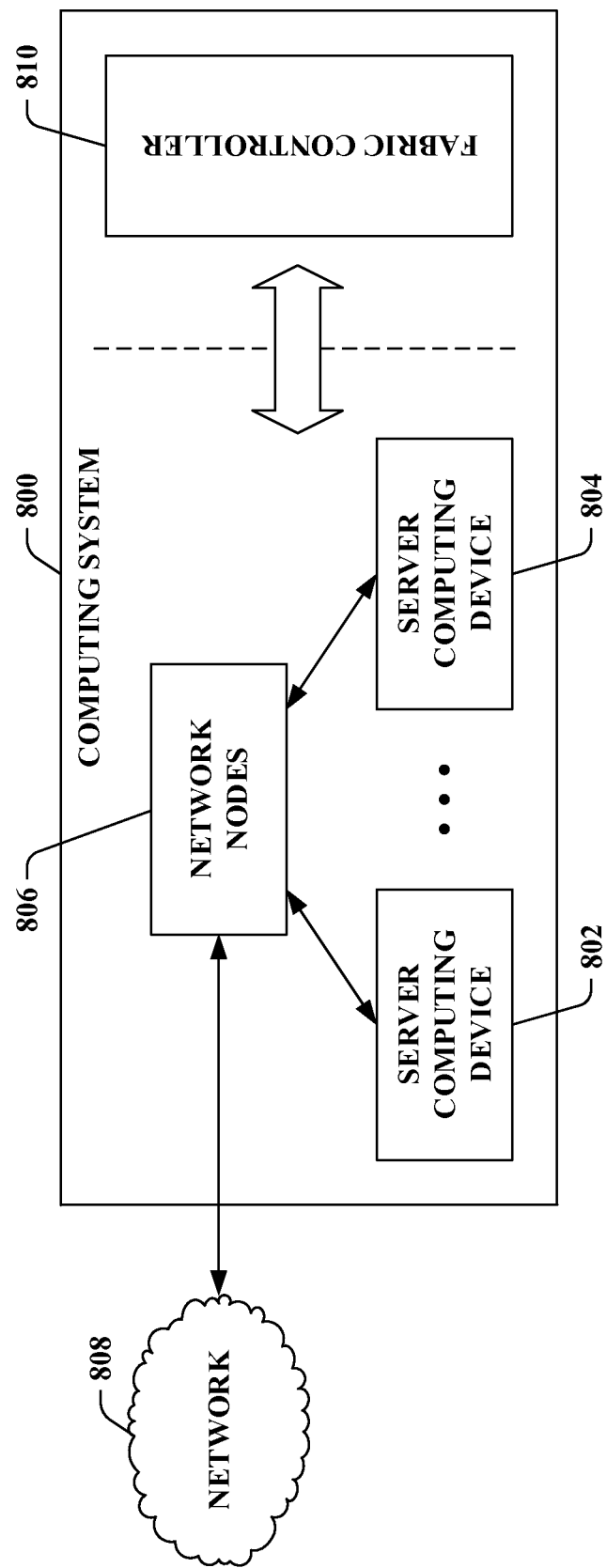
FIG. 8 illustrates an exemplary computing system.

Turning to FIG. 8, a high-level illustration of an exemplary computing system 800 that can be used in accordance with the systems and methodologies disclosed herein is illustrated. For instance, the computing system 800 can be or include the computing system 102. Additionally or alternatively, the computing system 102 can be or include the computing system 800.

The computing system 800 includes a plurality of server computing devices, namely, a server computing device 802, . . . , and a server computing device 804 (collectively referred to as server computing devices 802-804). The server computing device 802 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 802, at least a subset of the server computing devices 802-804 other than the server computing device 802 each respectively include at least one processor and a memory. Moreover, at least a subset of the server computing devices 802-804 include respective data stores.

Processor(s) of one or more of the server computing devices 802-804 can be or include the processor 104. Further, a memory (or memories) of one or more of the server computing devices 802-804 can be or include the memory 106. Moreover, a data store (or data stores) of one or more of the server computing devices 802-804 can be or include the data store 118.

The computing system 800 further includes various network nodes 806 that transport data between the server computing devices 802-804. Moreover, the network nodes 802 transport data from the server computing devices 802-804 to external nodes (e.g., external to the computing system 800) by way of a network 808. The network nodes 802 also transport data to the server computing devices 802-804 from the external nodes by way of the network 808. The network 808, for example, can be the Internet, a cellular network, or the like. The network nodes 806 include switches, routers, load balancers, and so forth.

A fabric controller 810 of the computing system 800 manages hardware resources of the server computing devices 802-804 (e.g., processors, memories, data stores, etc. of the server computing devices 802-804). The fabric controller 810 further manages the network nodes 806. Moreover, the fabric controller 810 manages creation, provisioning, de-provisioning, and supervising of virtual machines instantiated upon the server computing devices 802-804.

Various examples are now set forth.

EXAMPLE 1

A computing system, comprising: at least one processor; and memory that comprises a virtual machine that is executable by the processor, the virtual machine comprising: an execution component configured to execute a computer-executable program; an event logger component configured to log nondeterministic events during execution of the computer-executable program as part of event logs, the event logger component further configured to log the nondeterministic events via an interrogative virtual machine interface (VMI), the interrogative VMI being between the virtual machine and a browser system; a snapshot component configured to record a sequence of snapshots of the virtual machine during the execution of the computer-executable program, the snapshot component further configured to record the snapshots via the interrogative VMI; and a time travel debugger configured to replay at least a portion of the execution of the computer-executable program based at least in part on a snapshot from the sequence of snapshots and at least a portion of the event logs.

EXAMPLE 2

The computing system according to Example 1, wherein the interrogative VMI enables the snapshots and the event logs to be semantically complete.

EXAMPLE 3

The computing system according to any of Examples 1-2, wherein the snapshots and the event logs are device and address independent.

EXAMPLE 4

The computing system according to any of Examples 1-3, wherein a tick count associated with an animation is exposed to the virtual machine via the interrogative VMI, wherein the browser system further comprises a renderer component configured to perform the animation and associate the tick count with the animation, the tick count being indicative of how close the animation is to a final repaint.

EXAMPLE 5

The computing system according to any of Examples 1-4, wherein a callback list managed by a renderer component of the browser system is exposed to the virtual machine via the interrogative VMI.

EXAMPLE 6

The computing system according to any of Examples 1-5, wherein an event indicative of an external resource being downloaded by a network component of the browser system is exposed to the virtual machine via the interrogative VMI.

EXAMPLE 7

The computing system according to any of Examples 1-6, wherein at least one of the snapshots or the event logs comprise identities of callbacks and corresponding logical times at which the callbacks are set during the execution of the computer-executable program.

EXAMPLE 8

The computing system according to any of Examples 1-7, during the execution of the computer-executable program, the event logger component further configured to use the interrogative VMI to log: an event that is scheduled; a Document Object Model (DOM) tree difference between events for a DOM change; a tick count associated with an animation; a value change for a window state; a value from a synchronous source; and a timer identifier.

EXAMPLE 9

The computing system according to any of Examples 1-8, the time travel debugger further configured to: identify the snapshot from the sequence of snapshots, the snapshot temporally preceding a time t; load the snapshot that temporally preceded the time t; and replay the event logs from the snapshot to the time t.

EXAMPLE 10

The computing system according to any of Examples 1-8, the time travel debugger further configured to perform a reverse execution of the computer-executable program to a causal event based at least in part on the snapshot and the portion of the events logs.

EXAMPLE 11

The computing system according to any of Examples 1-10, the time travel debugger further comprising an analysis component configured to: evaluate latency of time travel operations; and based on the latency, cause the snapshot component to record an additional snapshot of the virtual machine during the replay of the portion of the execution of the computer-executable program.

EXAMPLE 12

The computing system according to any of Examples 1-11, the time travel debugger further comprising a reverse execute component configured to perform a reverse execution of the computer-executable program from a current breakpoint in the computer-executable program to a previous breakpoint in the computer-executable program, the reverse execute component configured to perform the reverse execution based at least in part on the snapshot and the portion of the event logs.

EXAMPLE 13

The computing system according to any of Examples 1-12, the time travel debugger further comprising a step back component configured to identify a previously executed statement prior to a breakpoint in the computer-executable program, the step back component configured to identify the previously executed statement based at least in part on the snapshot and the portion of the event logs.

EXAMPLE 14

The computing system according to any of Examples 1-13, wherein the interrogative VMI is layered atop a low-level VMI defined by a virtual machine monitor.

EXAMPLE 15

A method of performing time travel debugging, comprising: executing a computer-executable program, the computer-executable program being executable under control of a virtual machine, the virtual machine interacts with a browser system during execution of the computer-executable program; logging nondeterministic events via an interrogative virtual machine interface (VMI) during the execution of the computer-executable program, the nondeterministic events being logged as part of event logs, the interrogative VMI being between the virtual machine and the browser system; capturing snapshots of the virtual machine during the execution of the computer-executable program, the snapshots being captured via the interrogative VMI; and replaying at least a portion of the execution of the computer-executable program based at least in part on a snapshot and at least a portion of the event logs.

EXAMPLE 16

The method according to Example 15, further comprising utilizing the interrogative VMI to log: an event that is scheduled; a Document Object Model (DOM) tree difference between events for a DOM change; a tick count associated with an animation; a value change for a window state; a value from a synchronous source; and a timer identifier.

EXAMPLE 17

The method according to any of Examples 15-16, further comprising replaying the portion of the execution of the computer-executable program based on identities of callbacks and corresponding logical times at which the callbacks are set during the execution of the computer-executable program, wherein at least one of the snapshots or the event logs comprise the identities of the callbacks and the corresponding logical times.

EXAMPLE 18

The method according to any of Examples 15-17, replaying the portion of the execution of the computer-executable program further comprising: identifying the snapshot from the snapshots, the snapshot temporally preceding a time t; loading the snapshot that temporally preceded the time t; and replaying the event logs from the snapshot to the time t.

EXAMPLE 19

A method of performing time travel debugging, comprising: executing a computer-executable program, the computer-executable program being executable under control of a virtual machine, the virtual machine interacts with a browser system during execution of the computer-executable program; storing identities of callbacks and corresponding logical times at which the callbacks are set during the execution of the computer-executable program, wherein the identities of the callbacks and the corresponding logical times are exposed to the virtual machine via an interrogative virtual machine interface (VMI) during the execution of the computer-executable program, the interrogative VMI being between the virtual machine and the browser system; and replaying at least a portion of the execution of the computer-executable program based at least in part on the identities of the callbacks and the corresponding logical times.

EXAMPLE 20

The method according to Example 19, replaying the portion of the execution of the computer-executable program further comprising performing a reverse execution of the computer-executable program to a causal event based at least in part on the identities of the callbacks and the corresponding logical times.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
    at least one processor; and
    memory comprising a virtual machine executable by the at least one processor, wherein the virtual machine, when executed by the at least one processor:
        executes a computer-executable program via an interrogative virtual machine interface (VMI);
        interacts with a browser system during the execution of the computer-executable program via the interrogative VMI, wherein the interrogative VMI is located between the virtual machine and the browser system;
        logs nondeterministic events of the computing system during the execution of the computer-executable program, wherein the nondeterministic events are logged in event logs via the interrogative VMI;
        records a sequence of snapshots of the virtual machine during the execution of the computer-executable program via the interrogative VMI; and
        performs time travel debugging via the interrogative VMI by replaying at least a portion of the execution of the computer-executable program based at least in part on a snapshot from the sequence of snapshots and at least a portion of the event logs.

2. The computing system of claim 1, wherein the interrogative VMI enables the sequence of snapshots and the event logs to be semantically complete.

3. The computing system of claim 1, wherein the sequence of snapshots and the event logs are device and address independent.

4. The computing system of claim 1, wherein a tick count associated with an animation is exposed to the virtual machine via the interrogative VMI, wherein the browser system is further configured to perform the animation and associate the tick count with the animation, the tick count being indicative of how close the animation is to a final repaint.

5. The computing system of claim 1, wherein a callback function list managed by the browser system is exposed to the virtual machine via the interrogative VMI.

6. The computing system of claim 1, wherein an event indicative of a resource external to the computing system being downloaded by the browser system is exposed to the virtual machine via the interrogative VMI.

7. The computing system of claim 1, wherein at least one of the sequence of snapshots or the event logs comprise identities of callback functions and corresponding logical times at which the callback functions are set during the execution of the computer-executable program.

8. The computing system of claim 1, wherein during the execution of the computer-executable program, the virtual machine is further configured to use the interrogative VMI to log:
    an event that is scheduled;
    a Document Object Model (DOM) tree difference between events for a DOM change;
    a tick count associated with an animation;
    a value change for a window state;
    a value from a synchronous source; and
    a timer identifier.

9. The computing system of claim 1, wherein the virtual machine as part of the time travel debugging, is further configured to:
    identify the snapshot from the sequence of snapshots, the snapshot temporally preceding a time t;
    load the snapshot that temporally preceded the time t; and
    replay the event logs from the snapshot to the time t.

10. The computing system of claim 1, wherein the virtual machine as part of the time travel debugging, is further configured to perform a reverse execution of the computer-executable program to a causal event based at least in part on the snapshot and the portion of the event logs.

11. The computing system of claim 1, wherein the virtual machine, as part of the time travel debugging, is further configured to:
    evaluate latency of time travel operations; and
    based on the latency, cause an additional snapshot of the virtual machine to be recorded during the replay of the portion of the execution of the computer-executable program.

12. The computing system of claim 1, wherein the virtual machine as part of the time travel debugging is further configured to perform a reverse execution of the computer-executable program from a current breakpoint in the computer-executable program to a previous breakpoint in the computer-executable program, the reverse execution being performed based at least in part on the snapshot and the portion of the event logs.

13. The computing system of claim 1, wherein the virtual machine, as part of the time travel debugging, is further configured to identify a previously executed statement prior to a breakpoint in the computer-executable program, the previously executed statement being identified based at least in part on the snapshot and the portion of the event logs.

14. The computing system of claim 1, wherein the interrogative VMI is layered atop a low-level VMI defined by a virtual machine monitor.

15. A method of performing time travel debugging in a computing system, comprising:
   executing, by a virtual machine, a computer-executable program via an interrogative virtual machine interface (VMI);
   interacting, by the virtual machine and via the interrogative VMI, with a browser system during execution of the computer-executable program, wherein the interrogative VMI is located between the virtual machine and the browser system;
   logging, by the virtual machine, nondeterministic events of the computing system during the execution of the computer-executable program, wherein the nondeterministic events are logged in event logs via the interrogative VMI;
   recording, by the virtual machine, a sequence of snapshots of the virtual machine during the execution of the computer-executable program via the interrogative VMI; and
   performing, by the virtual machine and via the interrogative VMI, time travel debugging by replaying at least a portion of the execution of the computer-executable program based at least in part on a snapshot from the sequence of snapshots and at least a portion of the event logs.

16. The method of claim 15, further comprising utilizing the interrogative VMI to log:
   an event that is scheduled;
   a Document Object Model (DOM) tree difference between events for a DOM change;
   a tick count associated with an animation;
   a value change for a window state;
   a value from a synchronous source; and
   a timer identifier.

17. The method of claim 15, further comprising replaying the portion of the execution of the computer-executable program based on identities of callback functions and corresponding logical times at which the callback functions are set during the execution of the computer-executable program, wherein at least one of the sequence of snapshots or the event logs comprise the identities of the callback functions and the corresponding logical times.

18. The method of claim 15, wherein replaying the portion of the execution of the computer-executable program further comprises:
   identifying the snapshot from the sequence of snapshots, the snapshot temporally preceding a time t;
   loading the snapshot that temporally preceded the time t; and
   replaying the event logs from the snapshot to the time t.

19. A method of performing time travel debugging in a computing system, comprising:
   executing, by a virtual machine, a computer-executable program via an interrogative virtual machine interface (VMI);
   interacting, by the virtual machine and via the interrogative VMI, with a browser system to execute the computer-executable program, wherein the interrogative VMI is located between the virtual machine and the browser system;
   recording, by the virtual machine, a sequence of snapshots of the virtual machine during the execution of the computer-executable program via the interrogative VMI;
   storing, by the virtual machine and in the recorded snapshots, identities of callback functions responding to nondeterministic events of the computing system and corresponding logical times at which the callback functions are set during the execution of the computer-executable program, wherein the identities of the callback functions and the corresponding logical times are exposed to the virtual machine via the interrogative VMI during the execution of the computer-executable program; and
   performing, by the virtual machine and via the interrogative VMI, time travel debugging by replaying at least a portion of the execution of the computer-executable program based at least in part on the identities of the callback functions and the corresponding logical times.

20. The method of claim 19, wherein replaying the portion of the execution of the computer-executable program further comprises performing a reverse execution of the computer-executable program to a causal event based at least in part on the identities of the callback functions and the corresponding logical times.

* * * * *